(12) United States Patent
Sakaguchi et al.

(10) Patent No.: US 10,500,557 B2
(45) Date of Patent: Dec. 10, 2019

(54) INTERNALLY REINFORCED AEROGEL AND USES THEREOF

(71) Applicant: Blueshift Materials, Inc., San Marcos, TX (US)

(72) Inventors: Alan Sakaguchi, San Marcos, TX (US); Garrett Poe, San Marcos, TX (US); Michael Merwin, San Marcos, TX (US)

(73) Assignee: BLUESHIFT MATERIALS, INC., Spencer, MA (US)

(*) Notice: Subject to any disclaimer, the term of this patent is extended or adjusted under 35 U.S.C. 154(b) by 0 days.

(21) Appl. No.: 15/967,926

(22) Filed: May 1, 2018

(65) Prior Publication Data

US 2018/0290118 A1    Oct. 11, 2018

Related U.S. Application Data

(63) Continuation of application No. PCT/US2016/055775, filed on Oct. 6, 2016.

(60) Provisional application No. 62/250,044, filed on Nov. 3, 2015, provisional application No. 62/262,044, filed on Dec. 2, 2015.

(51) Int. Cl.
| | |
|---|---|
| *B01J 13/00* | (2006.01) |
| *B32B 5/02* | (2006.01) |
| *B32B 5/18* | (2006.01) |
| *B32B 5/24* | (2006.01) |

(52) U.S. Cl.
CPC .......... *B01J 13/0091* (2013.01); *B32B 5/022* (2013.01); *B32B 5/024* (2013.01); *B32B 5/18* (2013.01); *B32B 5/24* (2013.01); *B01D 2239/0613* (2013.01); *B01D 2239/0618* (2013.01); *B01D 2239/0654* (2013.01); *B01D 2239/10* (2013.01); *B01D 2239/1225* (2013.01);

(Continued)

(58) Field of Classification Search
None
See application file for complete search history.

(56) References Cited

U.S. PATENT DOCUMENTS

| | | | | |
|---|---|---|---|---|
| 6,087,407 A | * | 7/2000 | Coronado | ............ B01J 13/0091 521/181 |
| 7,410,718 B2 | * | 8/2008 | Cooper | ................. C04B 35/524 429/532 |

(Continued)

FOREIGN PATENT DOCUMENTS

| | | |
|---|---|---|
| CN | 1861250 | 11/2006 |
| EP | 2974858 | 1/1916 |

(Continued)

OTHER PUBLICATIONS

International Search Report and Written Opinion issued in International Patent Application No. PCT/US2016/055775, dated Nov. 28, 2016.

(Continued)

*Primary Examiner* — Chinessa T. Golden
(74) *Attorney, Agent, or Firm* — Norton Rose Fulbright US LLP

(57) ABSTRACT

Internally reinforced aerogels, articles of manufacture and uses thereof are described. An internally reinforced aerogel includes an aerogel having a support at least partially penetrating the aerogel and having the aerogel penetrating the porous structure of the support.

30 Claims, 8 Drawing Sheets

(52) U.S. Cl.
CPC ................ *B32B 2262/0215* (2013.01); *B32B 2262/0253* (2013.01); *B32B 2262/0284* (2013.01)

(56) References Cited

U.S. PATENT DOCUMENTS

| | | |
|---|---|---|
| 8,765,230 B1 | 7/2014 | Waldrop, III et al. |
| 2004/0132845 A1 | 7/2004 | Rhine et al. |
| 2005/0096661 A1 | 5/2005 | Farrow et al. |
| 2006/0240216 A1* | 10/2006 | Stepanian ............ F16L 59/065 428/76 |
| 2007/0238008 A1* | 10/2007 | Hogan ................... B60R 13/08 219/458.1 |
| 2012/0097907 A1* | 4/2012 | Bauer ................... C04B 14/064 252/602 |
| 2014/0272358 A1 | 9/2014 | Meador et al. |
| 2015/0017860 A1* | 1/2015 | Bullock ................. B32B 5/245 442/221 |

FOREIGN PATENT DOCUMENTS

| | | | |
|---|---|---|---|
| WO | WO 2007/011750 | 1/2007 | |
| WO | WO-2013136034 A1 * | 9/2013 | ............ D06M 11/74 |

OTHER PUBLICATIONS

Office Action issued in corresponding Chinese Patent Application No. 201680064190.0, dated Sep. 25, 2019 (English translation provided).

Search Report issued in corresponding Chinese Patent Application No. 201680064190.0, dated Sep. 17, 2019 (English translation provided).

* cited by examiner

INTERNALLY REINFORCED AEROGEL AND USES THEREOF

CROSS-REFERENCE TO RELATED APPLICATIONS

This application is a 35 U.S.C. § 111(a) continuation of International Application No. PCT/US2016/055775 filed Oct. 6, 2016, which claims priority to and the benefit of U.S. Provisional Application No. 62/250,044 filed Nov. 3, 2015, and U.S. Provisional Application No. 62/262,044, filed Dec. 2, 2015. The contents of the referenced applications are incorporated into the present application by reference.

BACKGROUND OF THE INVENTION

A. Field of the Invention

The present disclosure relates to the field of aerogels. In particular, the invention concerns a reinforced aerogel that includes a support material (e.g., film or layer) at least partially penetrating the aerogel.

B. Description of Related Art

A gel by definition is a spongelike, three-dimensional solid network whose pores are filled with another non-gaseous substance, such as a liquid. The liquid of the gel is not able to diffuse freely from the gel structure and remains in the pores of the gel. Drying of the gel that exhibits unhindered shrinkage and internal pore collapse during drying provides materials commonly referred to as xerogels. By contrast, a gel that dries and exhibits little or no shrinkage and internal pore collapse during drying can yield an aerogel. An aerogel is a porous solid that is formed from a gel, in which the liquid that fills the pores of the solid has been replaced with a gas. Shrinkage of the gel's solid network during drying is negligible or all-together prevented due to the minimization of or resistance to the capillary forces acting on the network as the liquid is expended. Aerogels are generally characterized as having high porosity (about 94-98%), and high specific surface area. Aerogels also possess relatively low densities and are unique solids with up to 99% porosity. Such large porosities confer a number of useful properties to aerogels, including high surface area, low refractive index, low dielectric constant, low thermal-loss coefficient, and low sound velocity.

However, conventional aerogels lack mechanical durability. The lack of durability can have a negative impact on production scale-up, large scale manufacturing, conformation to irregular surfaces, or maintaining integrity in dynamic conditions. Therefore, flexibility, compressibility, integrity, durability, strength, and resistance to tearing are all areas for potential improvement in aerogels.

SUMMARY OF THE INVENTION

The inventors have discovered a process to make a reinforced aerogel that provides improved durability while maintaining other beneficial characteristics of the aerogel. Embodiments are directed to an aerogel with a support material (e.g., film or layer) incorporated into the aerogel—an internal reinforcement of the aerogel. The material strength, flex fatigue, tear resistance, and other mechanical properties of the resulting aerogel are improved while retaining thermal and acoustic insulation properties.

Certain embodiments are directed to an internally reinforced aerogel comprising an aerogel having a support at least partially penetrating the aerogel and having the aerogel penetrating the structure of the support, i.e., incorporating the support into the aerogel. Certain aspects are directed to an internally reinforced aerogel in which the support is integrated with the aerogel without the use of any external adhesive to adhere the support to the aerogel, that is in certain aspects the internally reinforced aerogel specifically excludes the use of any adhesives. In further aspects the support fully penetrates the aerogel and is positioned approximately equal distance from the top and bottom edges the aerogel, or is positioned anywhere in between the outer edges of the support. In certain aspects the support partially penetrates the aerogel (with the aerogel also penetrating the support) and with a portion of the support being position outside or aligned with an outer edge of the aerogel. In certain aspects the aerogel is a polymer aerogel. In a further aspect the aerogel is a polyimide aerogel. In some instances, the support can be in the form of a film or layer. In particular instances, the support can be a plurality of fibers in the aerogel, a film or layer of fibers in the aerogel, fiber containing films or layers, or a support film or layer comprising two or more fiber layers pressed together to form the support.

In certain aspects the aerogel is in the form of a reinforced thin film or layer. The aerogel can be between 1.5, 2, 3, 4, 5, 6, 7, 8, or 9 mils to 8, 9, 10, 11, 12, 13, 14, or 15 mils thick, including all values and ranges there between. In certain aspect the aerogel is at most 8, 9, 10, 11, 12, 13, 14, or 15 mils thick.

The aerogel can be reinforced with a support that is in form of a thin film or sheet or layer forming a support film. In certain aspects the support is between 0.25, 0.5, or 0.75 mils to 0.5, 0.75, or 1 mil thick, including all values and ranges there between. The support can comprise 1, 2, 3, or more support layers that are pressed or positioned immediate adjacent to each other to form a support film. In a further aspect the support is 1 mil or less in thickness. In certain aspect the thickness of the support film to aerogel is about 1:1, 1:2, 1:10, 1:50, 1:100, or 1:150, including all ratios and ranges there between. The support can be a woven or non-woven polymeric or fiber support. In certain aspects the fiber support comprises fibers having an average filament cross sectional area of 7 or 800 µm$^2$. In certain aspects the fiber support comprises at least one layer of unidirectional fibers, omnidirectional fibers, or combinations thereof. In certain aspects the fiber support comprises omnidirectional fibers. In still further aspects the fiber support comprises fibers with an aspect ratio of less than, about or greater than 40, 50, 60, or 70. The fibers in the fiber support can be microfibers.

The fiber support can comprise natural, synthetic, semi-synthetic fibers, or combinations thereof. The fibers of the fiber support can be vegetable, wood, animal, mineral, biological fibers, or combinations thereof. In certain aspects the fibers of the fiber support comprise cellulose, rayon, bamboo, diacetate, triacetate fibers, or combinations thereof. In a further aspect the fibers can comprise metal, carbon, carbide, glass, mineral fibers, or combinations thereof. In still a further aspect the fibers of the fiber support comprise thermoplastic polymer, thermoset polymer fibers, or combinations thereof. A thermoplastic fiber can be a fiber of polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. In certain aspect the thermoset fiber is a fiber of polyaramid, polyimide, polybenzoxazole, polyurethane, or blends thereof. The fiber support can be vinylon, polyolefin, polyethylene, or polyester fiber support.

In certain aspects the support is a paper or cellulose support. Paper is a thin material produced by pressing together moist fibers, typically cellulose pulp derived from wood or grasses and drying them into flexible sheets. The thickness of paper is often measured by caliper, which is typically given in thousandths of an inch. The density of paper ranges from 250 kg/m$^3$ (16 lb/cu ft) for tissue paper to 1,500 kg/m$^3$ (94 lb/cu ft) for some specialty paper. In certain aspect the paper is a porous blotting paper having a thickness of 0.5 to 2 mm, including all values there between. In a further aspect the paper is chromatography paper having a thickness 0.05 to 0.25 mm and pores having a diameter of 5 to 15 µm. In certain aspects Hirose paper can be used (Hirose Paper Mfg Co, Kochi, Japan). Paper can be obtained that is a non-woven paper, with or without a nanofiber overlay, with a basis weight of less than 50, 60, 70 or 80 g/m$^2$. In a further aspect the paper can have a basis weight between 4 and 50 g/m$^2$, and a thickness of between 10 and 50 µm up to 0.5 mm. The paper can comprise cellulose, vinylon, polyester, polyolefin, polypropylene fibers or various combinations thereof.

In certain aspects the reinforced aerogel has a flex fatigue of at least 50,000, 100,000, to 500,000 cycles to failure. In a further aspect the aerogel has a tensile strength at 23° C. of at least 5, 10, 15, to 15, 20, 25 MPa, including all values and ranges there between. In other aspects the reinforced gel can have a Young's modulus of 200, 225, 250, 275, 300, 325, to 350 MPa, including all values there between.

Other embodiments are directed to the methods for manufacturing a reinforced aerogel. In certain aspects the method of manufacturing an aerogel composite having an internal support comprising: forming an aerogel on the surface of a support film forming a supported aerogel; and rolling the supported aerogel to form an internally reinforced aerogel, wherein the rolling results in the pressing of the support into the aerogel thin film. In other aspects the support can be incorporated into the aerogel by spin coating, solvent casting, or spraying an aerogel thin film or an aerogel precursor solution on, around, and/or within the support.

In some aspects, an article of manufacture is disclosed. The article of manufacture can include the reinforced aerogel. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus. In some embodiments, the highly branched polyimide aerogels described herein are included in an antenna, sunshield, sunscreen, a radome, or a filter.

In some aspects, disclosed herein are methods for filtering a fluid using the reinforced aerogel described herein. The fluid can contain impurities and/or desired substances. The method can include contacting a feed fluid with the branched polyimide aerogel under conditions sufficient to remove at least a portion of the impurities and/or desired substances from the feed fluid and produce a filtrate. In some instances, the aerogel can be in the form of a film, powder, blanket, or a monolith. In some instances, the feed fluid used in the methods disclosed herein can be a liquid, a gas, a supercritical fluid, or a mixture thereof. The feed fluid can contain water ($H_2O$) and/or be a non-aqueous liquid. The non-aqueous fluid can be an oil, a solvent, or any combination thereof. In some instances, the feed fluid can be a solvent (e.g., an organic solvent). The feed fluid can be an emulsion (e.g., a water-oil emulsion, an oil-water emulsion, a water-solvent emulsion, a solvent-water emulsion, an oil-solvent emulsion, or a solvent-oil emulsion). The feed fluid can be a biological fluid (e.g., blood, plasma, or both). The feed fluid can be a gas (e.g., air, nitrogen, oxygen, an inert gas, or mixtures thereof). In some instances, the filtrate can be substantially free of impurities and/or a desired substance.

In some aspects, the present disclosure provides a system for filtering a fluid that includes impurities and/or desired substances. The system can include the reinforced branched aerogel described herein and a separation zone in fluid communication with the aerogel, a feed fluid, and a filtrate.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The following includes definitions of various terms and phrases used throughout this specification.

"Aerogel," as used herein, refers to a unique class of low density and primarily open-cell materials. Aerogels are a class of materials generally formed by removing a mobile interstitial solvent phase from the pores of a gel structure supported by an open-celled polymeric material at a temperature and pressure above the solvent critical point. By controlling the gel and evaporation system, shrinkage and pore collapse are not realized. Aerogels typically have low bulk densities (about 0.15 g/cm$^3$ or less, preferably about 0.03 to 0.3 g/cm$^3$), very high surface areas (generally from about 200 to 1,000 m$^2$/g and higher, preferably about 700 to 1000 m$^2$/g), high porosity (about 90% and greater, preferably greater than about 97%), and relatively large pore volume (more than about 3.8 mL/g, preferably about 3.9 mL/g and higher).

The term "non-woven" is defined as material made of fibers that does not have a woven or interlaced architecture using continuous fibers. However, the non-woven fibrous region of the supports of the present invention may have some inadvertent cross-over of some of the individual filaments, such cross-over does not change the non-woven structure of the fibrous region and is not a designed continuous aspect of the material.

The terms "impurity" or "impurities" refers to unwanted substances in a feed fluid that are different than a desired filtrate and/or are undesirable in a filtrate. In some instances, impurities can be solid, liquid, gas, or supercritical fluid. In some embodiments, an aerogel can remove some or all of an impurity.

The term "desired substance" or "desired substances" refers to wanted substances in a feed fluid that are different than the desired filtrate. In some instances, the desired substance can be solid, liquid, gas, or supercritical fluid. In some embodiments, an aerogel can remove some or all of a desired substance.

The term "radio frequency (RF)" refers to the region of the electromagnetic spectrum having wavelengths ranging from $10^{-4}$ to $10^7$ m.

The use of the word "a" or "an" when used in conjunction with the terms "comprising," "including," "containing," or "having" in the claims and/or the specification may mean "one," but it is also consistent with the meaning of "one or more," "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

Figure 1:
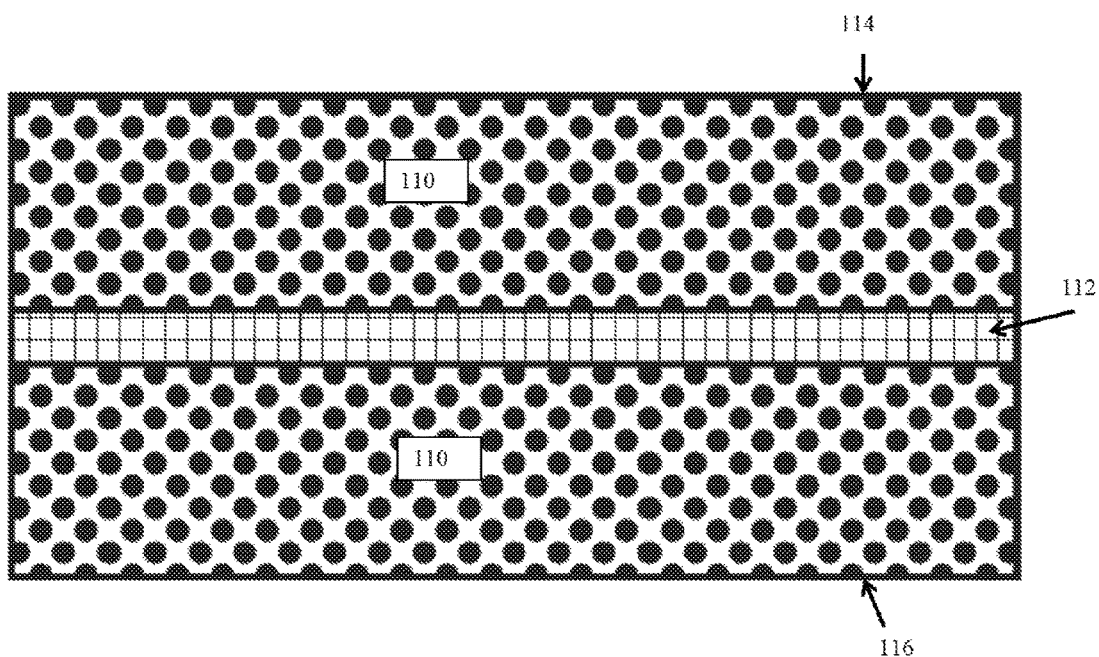
FIG. 1 is an illustration of an embodiment of an internally reinforced aerogel having the support positioned at about the midline of the aerogel.

While the invention is susceptible to various modifications and alternative forms, specific embodiments thereof are shown by way of example in the drawings and may herein be described in detail. The drawings may not be to scale.

DETAILED DESCRIPTION

Aerogels are well-known for their low-density and effectiveness as thermal insulators. Aerogels are produced from a gel wherein the liquid component of the gel has been replaced with a gas. Aerogels consist of a highly porous network of micropores and mesopores—"micropores" being pores with diameters less than 2 nm, and "mesopores" being pores with diameters between 2 nm and 50 nm. The pores of an aerogel can frequently account for over 90% of the volume when the density of the aerogel about 0.05 g/cm$^3$. Aerogels are generally prepared by a supercritical drying technique to remove the solvent from a gel (a solid network that encapsulates its solvent) such that no solvent evaporation can occur, and consequently no contraction of the gel can be brought by capillary forces at its surface. For polymer-based aerogels aerogel preparation typically proceeds as follows: (1) polymerization of the polymer gel; (2) formation of the gel; and (3) solvent removal by supercritical drying.

During manufacture of a polyimide aerogel the inventors used a reinforcing support film as a carrier to support the gelled film during processing. During rewinding, the gelled film was unexpectedly and irreversibly pressed into the carrier film, providing a substantial durability improvement. The inventors have subsequently applied this observation to a solvent casting process where the aerogel is cast into a reinforcement or support to achieve maximum penetration. The substrate selection and direct casting have allowed the minimization of the thickness of the resulting reinforced aerogel material.

The present invention also provides processes for the production of fiber reinforced polymer aerogels—internally reinforced polyimide aerogels are provided as an example. The process includes: (a) forming poly(amic acid) solution from a mixture of dianhydride and diamine monomers in a polar solvent such as dimethylsulfoxide (DMSO), N,N-dimethylacetamide (DMAc), N-methylpyrolidone (NMP), or N,N-dimethylformamide (DMF); (b) contacting the poly (amic acid) solution with chemical curing agents such as triethylamine and acetic anhydride to initiate chemical imidization; (c) casting the poly(amic acid) solution onto a fibrous support prior to gelation and allow it to permeate it; (d) allowing the catalyzed poly(amic acid) solution to gel around and into the fibrous support during chemical imidization; (e) optionally performing a solvent exchange, which can facilitate drying; and (f) removal of the transient liquid phase contained within the gel with supercritical, subcritical, or ambient drying to give an internally reinforced aerogel. The polyimide aerogels can be produced from aromatic dianhydride and diamine monomers, such as aromatic diamines or a mixture of at least one aromatic diamine monomer and at least one aliphatic diamine monomer. The resulting polyimide aerogel can be optimized to possess low density, meso-pores, narrow pore size distribution and good mechanical strength.

The preparation of polyimide wet gels is a two-step procedure: (a) formation of the poly(amic acid) solution from a mixture of dianhydride and diamine in a polar solvent such as N,N-dimethylacetamide (DMAc), N-methylpyrolidone (NMP), N,N-dimethylformamide (DMF), or dimethylsulfoxide (DMSO); and (b) catalyzed cyclization with chemical catalyzing agents such as acetic anhydride and triethylamine to form polyimide. Previous work with synthesizing polyimide aerogels has shown that the first step typically requires at least 30 minutes mixing at room temperature allowing for significant formation of the poly(amic acid) polymer and yielding stable, robust wet gels. Gelation conditions depend on several factors, including the prepared density of the solution and the temperature of the heating oven. Higher density solutions will gel faster than lower density solutions. Once the system has reached the gelled state, the gels are rinsed repeatedly with acetone, ethanol, or the like. Rinsing occurs at least three times prior to drying, and serves to remove residual solvent and unreacted monomers. $CO_2$ can then be used in techniques known to those in the art for wet solvent extraction to create the aerogel structure. Other techniques for preparing and optimizing polyimide aerogels can be used and are known in the art.

A. Internally Reinforced Aerogels

The internally reinforced aerogels can be any width or length. The internally reinforced aerogel can be in the form of defined geometry (e.g., a square or circular patch) or in the form of a sheet or roll. In some instances, the internally reinforced aerogels can have a width up to 6 meters and a length of up to 10 meters, or from 0.01 to 6 meters, 0.5 to 5 meters, 1 to 4 meters, or any range in between, and a length of 1 to 10,000 meters, 5 to 1,000 meters, 10 to 100 meters or any range there between. The width of the composite can be 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0 feet or meters, including any value there between. The length of the internally reinforced aerogels can be 1, 10, 100, 500, 1000, 1500, 2000, 2500, 3000, 3500, 4000, 4500, 5000, 5500, 6000, 6500, 7000, 7500, 8000, 8500, 9000, 9500, 10000 meters or feet and include any value there between. In certain aspect the length of the internally reinforced aerogel can be 1000 feet or meters, and 60 inches or 1.5 meters, respectively, in width. In a further embodiment the internally reinforced aerogel is 100 feet in length and 40 inches wide.

In certain embodiments the internally reinforced aerogel includes a non-woven support at least partially or fully embedded or incorporated in a polymeric aerogel.

The support can be comprised of a plurality of fibers. The fibers can be unidirectionally or omnidirectionally oriented. The support can comprise, by volume, at least 0.1 to 50% of the internally reinforced aerogel. The support can be in the form of a plurality of fibers, a film or layer of fibers, fiber containing films or layers, or a support film or layer comprising two or more fiber layers pressed together to form the support. The support can comprise cellulose fibers, glass fibers, carbon fibers, aramid fibers, polyethylene fibers, polyester fibers, polyamide fibers, ceramic fibers, basalt fibers, rock wool, or steel fibers, or mixtures thereof. The fibers can have an average filament cross sectional area of 7 $\mu m^2$ to 800 $\mu m^2$, which equates to an average diameter of 3 to 30 microns for circular fibers. Bundles of various kinds of fibers can be used depending on the use intended for the internally reinforced aerogel. For example, the bundles may be of carbon fibers or ceramic fibers, or of fibers that are precursors of carbon or ceramic, glass fibers, aramid fibers, or a mixture of different kinds of fiber. Bundles can include any number of fibers. For example, a bundle can include 400, 750, 800, 1375, 1000, 1500, 3000, 6000, 12000, 24000, 50000, or 60000 filaments. The fibers can have a filament diameter of 5 to 24 microns, 10 to 20 microns, or 12 to 15 microns or any range there between, or 5, 6, 7, 8, 9, 10, 11, 12, 13, 14, 15, 16, 17, 18, 19, 20, 21, 22, 23, 24 microns or any value there between. The fibers in a bundle of fibers can have an average filament cross sectional area of 7 $\mu m^2$ to 800 $\mu m^2$, which equates to an average diameter of 3 to 30 microns for circular fibers. Cellulose and paper supports can be obtained from Hirose Paper Mfg Co (Kochi, Japan) or Hirose Paper North America (Macon, Ga., USA).

Non-limiting examples of thermoplastic polymers include polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof.

Non-limiting examples of thermoset polymers include unsaturated polyester resins, polyurethanes, polyoxybenzylmethylenglycolanhydride (e.g., bakelite), urea-formaldehyde, diallyl-phthalate, epoxy resin, epoxy vinylesters, polyimides, cyanate esters of polycyanurates, dicyclopentadiene, phenolics, benzoxazines, co-polymers thereof, or blends thereof.

In other aspects the internally reinforced aerogel can includes two or more layers of a support. In certain instances a support can include two unidirectional supports in contact with each other and arranged such that the unidirectional fibers are oriented in different directions to each other. In other instances the support can comprises two or more layers of a support having omnidirectional fibers.

The support is positioned at least partially or fully inside a polymeric aerogel, forming an internal support and an external aerogel. As used herein any support that is at least partially permeated with aerogel material is can be partially internalized. The width and length of the aerogel is substantially similar to the width and length of the internal or partially internalized support.

FIG. 1 illustrates an internally reinforced aerogel having internal support 112 positioned at about the midline of aerogel 110. Support 112 is approximately equidistant from top edge 114 and bottom edge 116.

Figure 2:
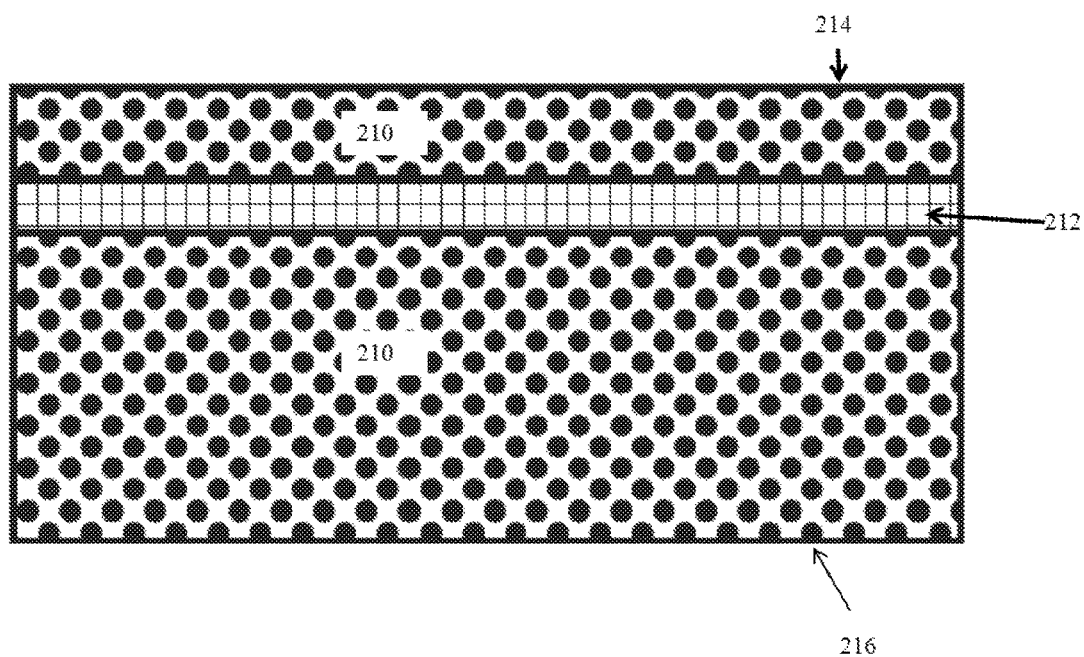
FIG. 2 is an illustration of embodiment of an internally reinforced aerogel having the support positioned at internal offset position in the aerogel.

FIG. 2 illustrates and embodiment where internal support 212 is in an offset position within aerogel 210. Support 212 being closer to one edge (in the illustrated case top edge 214) than the other edge (bottom edge 216). In other embodiments support 212 can be positioned closer to the bottom edge.

Figure 3:
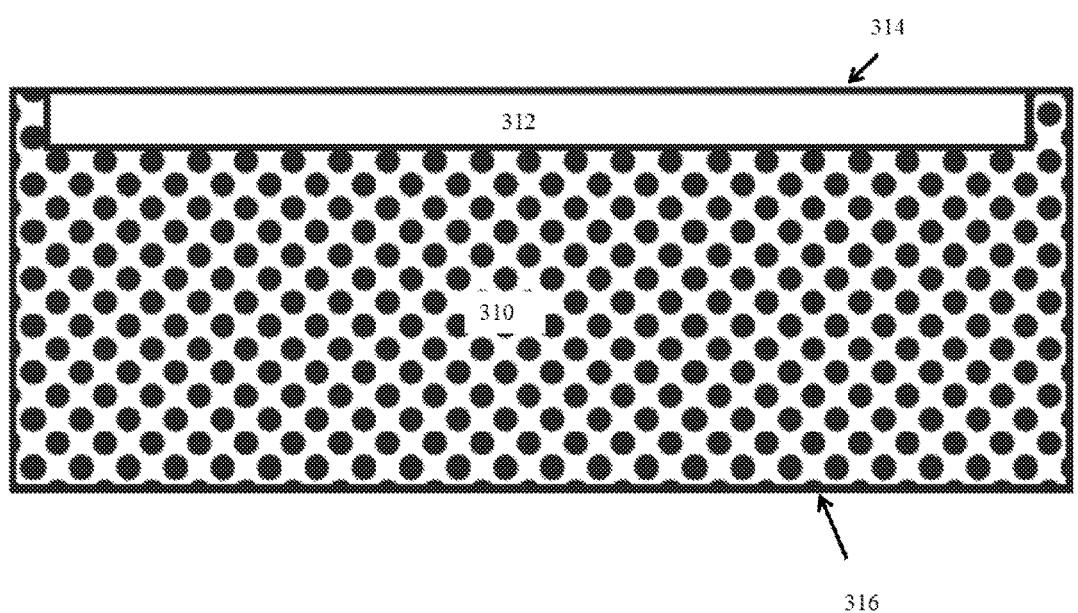
FIG. 3 is an illustration of an embodiment of an internally reinforced aerogel having the support positioned at the edge of the aerogel.

FIG. 3 illustrates an embodiment where the outer edge of support 312 is positioned along the top edge 314 of aerogel 310. In other embodiments support 312 can be positioned along bottom edge 316.

Figure 4:
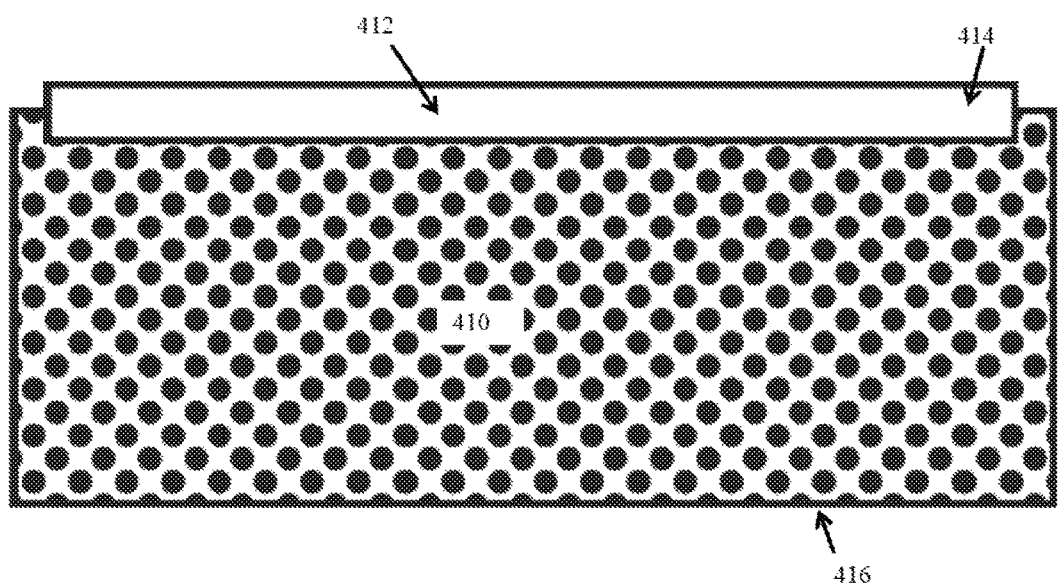
FIG. 4 is an illustration of an embodiment of an internally reinforced aerogel having the support positioned partially penetrating the aerogel.

FIG. 4 illustrates another embodiment where support 412 is partially incorporated into aerogel 410. In this embodiments a portion of the support is above or outside top edge 414. In other embodiments the position of the support can be at bottom edge 416.

Figure 5:
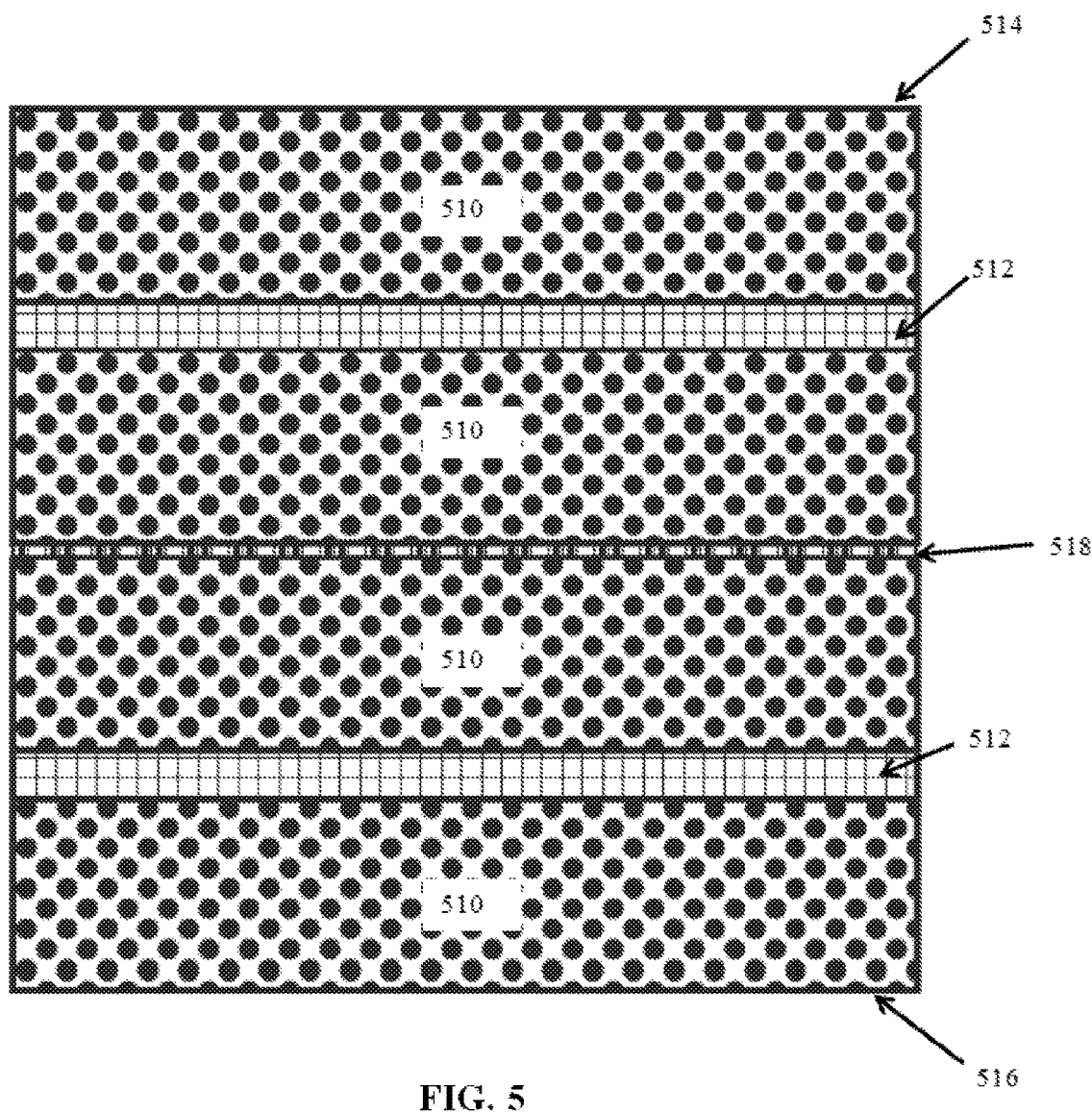
FIG. 5 is an illustration of an embodiment of an aerogel laminate comprising a plurality or reinforced aerogels formed into a multiplayer laminate structure.

In certain embodiments a reinforced aerogel laminate can be constructed having 2, 3, 4, 5 or more reinforced aerogel layers (see FIG. 5). FIG. 5 shows a two-layer laminate. In this example each layer is configured as shown in FIG. 1; however, any number of reinforced aerogel configurations can be used and in any combination. Each of the reinforced aerogel layer depicted in FIG. 5 comprise aerogel 510 and support 512. The layers can be adhered to each through an aerogel/aerogel interface or by an adhesive 518. The laminate having top edge 514 and a bottom edge 516.

The cross-sectional thickness of the internally reinforced aerogel measure from top most edge to bottom most edge can be between 3 and 16 mils, including all values and ranges there between. The support can be positioned in the aerogel so that about 0, 1, 2, 3, 4, 5, 6, 7, 8, 9, 10, 11, 12, 13, 14, or 15 mil of the aerogel is above the support. In certain instances the support is approximately within about 0.5 mils of the aerogel midline. In a further aspect about 0.1 to 0.5 mil of support extends beyond one of the aerogel edges with a portion of the support being embedded or incorporated in the aerogel.

B. Polymeric Aerogels

The aerogel matrix of the present invention may be organic, inorganic, or a mixture thereof. The aerogels or wet gels used to prepare the aerogels may be prepared by any known gel-forming techniques: examples include adjusting the pH and/or temperature of a dilute metal oxide sol to a point where gelation occurs. Organic aerogels can be made from polyacrylates, polystyrenes, polyacrylonitriles, polyurethanes, polyimides, polyamides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like. In particular embodiments the aerogel is a polyimide aerogel.

Polyimides are a type of polymer with many desirable properties. In general, polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a trimethylsilyl ester, all of which can react with a diamine to produce a polyimide polymer. Dianhydrides are to be understood as tetraesters, diester acids, tetracarboxylic acids, or trimethylsilyl esters that can be substituted, as appropriate. There are also other types of monomers that can be used in place of the di-acid monomer, as known to those skilled in the art.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a poly(amic acid).

The polyimide polymer is usually formed from two different types of monomers, and it is possible to mix different varieties of each type of monomer. Therefore, one, two, or more di-acid monomers can be included in the reaction vessel, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties. For example, a single diamine monomer AA can be reacted with two di-acid co monomers, $B_1B_1$ and $B_2B_2$, to form a polymer chain of the general form of $(AA-B_1B_1)_x-(AA-B_2B_2)_y$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1-BB)_x-(A_2A_2-BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1-B_1B_1)_w-(A_1A_1-B_2B_2)_x-(A_2A_2-B_1B_1)_y-(A_2A_2-B_2B_2)_z$, where w, x, y, and z are determined by the relative incorporation of $A_1A_1$-$B_1B_1$, $A_1A_1$-$B_2B_2$, $A_2A_2$-$B_1B_1$, and $A_2A_2$-$B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

There are many examples of monomers that can be used to make polyimide polymers. A non-limiting list of possible diamine monomers comprises 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis[4-(4-aminophenoxy)phenyl] sulfones, 2,2-bis[4-(3-aminophenoxy)phenyl]sulfones, bis (4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl) aniline, bis(p-beta-amino-t-butylphenyl)ether, p-bis-2-(2-methyl-4-aminopentyl)benzene, p-bis(1,1-dimethyl-5-aminopentyl)benzene, 1,3-bis(4-aminophenoxy)benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine.

A non-limiting list of possible dianhydride ("diacid") monomers includes hydroquinone dianhydride, 3,3',4,4'-biphenyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfone tetracarboxylic dianhydride, 4,4'-(4,4'-isopropylidenediphenoxy)bis(phthalic anhydride), 2,2-bis(3,4-dicarboxyphenyl) propane dianhydride, 4,4'-(hexafluoroi sopropylidene) diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylie dianhydride, 4,4'-oxydiphthalic dianhydride, 3,3',4,4'-biphenyl sulfone tetracarboxylic dianhydride, 3,4,9,10-perylene tetracarboxylic dianhydride, bis(3,4-dicarboxyphenyl)sulfide dianhydride, bis(3,4-dicarboxyphenyl) methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene-, 8,9,10-tetracarboxylie dianhydride, pyrazine-2,3,5,6-tetracarboxylic dianhydride, benzene-1,2,3,4-tetracarboxylic dianhydride, and thiophene-2,3,4,5-tetracarboxylic dianhydride.

A poly(amic acid) is soluble in the reaction solvent and, thus, the solution may be cast into a film on a suitable substrate, support, or support on a substrate such as by spin casting, gravure coating, three roll coating, knife over roll coating, slot die extrusion, dip coating, Meyer rod coating, or other techniques. The cast film can then be heated in stages to elevated temperatures to remove solvent and convert the amic acid functional groups in the poly(amic acid) to imides with a cyclodehydration reaction, also called imidization. "Imidization" is defined as the conversion of a polyimide precursor into an imide. Alternatively, some poly (amic acid)s may be converted in solution to polyimides by using a chemical dehydrating agent, catalyst, and/or heat.

Many polyimide polymers are produced by preparing a poly(amic acid) polymer in the reaction vessel. The poly (amic acid) is then formed into a sheet or a film and subsequently processed with heat (often temperatures higher than 250 degrees Celsius) or both heat and catalysts to convert the poly(amic acid) to a polyimide.

The characteristics or properties of the final polymer are significantly impacted by the choice of monomers which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

In some instances, the backbone of the polymer can include substituents. The substituents (e.g., oligomers, functional groups, etc.) can be directly bonded to the backbone or linked to the backbone through a linking group (e.g., a tether or a flexible tether). In other embodiments, a compound or particles can be incorporated (e.g., blended and/or encapsulated) into the polyimide structure without being covalently bound to the polyimide structure. In some instances, the incorporation of the compound or particles can be performed during the polyamic reaction process. In some instances, particles can aggregate, thereby producing polyimides having domains with different concentrations of the non-covalently bound compounds or particles.

Specific properties of a polyimide can be influenced by incorporating certain compounds into the polyimide. The selection of monomers is one way to influence specific properties. Another way to influence properties is to add a compound or property modifying moiety to the polyimide.

C. Synthesis of Aerogels

The first stage in the synthesis of an aerogel is the synthesis of a polymerized gel. For example, if a polyimide aerogel is desired, at least one acid monomer can be reacted with at least one diamino monomer in a reaction solvent to form a poly(amic acid). As discussed above, numerous acid monomers and diamino monomers may be used to synthesize the poly(amic acid). In one aspect, the poly(amic acid) is contacted with an imidization catalyst in the presence of a chemical dehydrating agent to form a polymerized polyimide gel via an imidization reaction. Any imidization catalyst suitable for driving the conversion of polyimide precursor to the polyimide state is suitable. Preferred chemical imidization catalysts comprise at least one compound selected from the group consisting of pyridine, methylpyridines, quinoline, isoquinoline, 1,8-Diazabicyclo[5.4.0]undec-7-ene (DBU), triethylenediamine, lutidine, N-methylmorpholine, triethylamine, tripropylamine, tributylamine, and other trialkylamines. Any dehydrating agent suitable for use in formation of an imide ring from an amic acid precursor is suitable for use in the methods of the present invention. Preferred dehydrating agents comprise at least one compound selected from the group consisting of acetic anhydride, propionic anhydride, n-butyric anhydride, benzoic, anhydride, trifluoroacetic anhydride, phosphorus trichloride, and dicyclohexylcarbodiimide.

The reaction solvent may be selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, and mixtures thereof. The reaction solvent and other reactants will be selected based on the compatibility with the support material.

The polyimide solution may optionally be cast onto a casting sheet covered by a support film for a period of time. In one embodiment, the casting sheet is a polyethylene terephthalate (PET) casting sheet. After a passage of time, the polymerized reinforced gel is removed from the casting sheet and prepared for the solvent exchange process.

1. Solvent Exchange

After the polymer gel is synthesized and a support film incorporated, it is desirable to conduct a solvent exchange wherein the reaction solvent is exchanged for a more desirable second solvent. Accordingly, in one embodiment, a solvent exchange can be conducted wherein the polymerized gel is placed inside of a pressure vessel and submerged in a mixture comprising the reaction solvent and the second solvent. Then, a high pressure atmosphere is created inside of the pressure vessel thereby forcing the second solvent into the polymerized gel and displacing a portion of the reaction solvent. Alternatively, the pressure exchange step may be conducted without the use of a high pressure environment. It may be necessary to conduct a plurality of rounds of solvent exchange.

The time necessary to conduct the solvent exchange will vary depending upon the type of polymer undergoing the exchange as well as the reaction solvent and second solvent being used. In one embodiment, each solvent exchange can range from 1 to 168 hours or any period time there between including 2, 3, 4, 5, 6, 7, 8, 9, 10, 11, 12, 13, 14, 15, 16, 17, 18, 19, 20, 21, 22, or 23, 24, 25, 50, 75, 100, 125, 150, 155, 160, 165, 166, 167, or 168 hours. In another embodiment, each solvent exchange can take approximately 15 to 60 minutes, or about 30 minutes. Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. Each second solvent has a freezing point. For example tert-butyl alcohol has a freezing point of 25.5 degrees Celsius and water has a freezing point of 0 degrees Celsius under one atmosphere of pressure.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

2. Cooling and Drying

In one embodiment after solvent exchange, the polymerized reinforced gel is exposed to supercritical drying. In this instance the solvent in the gel is removed by supercritical $CO_2$ extraction.

In another embodiment after solvent exchange, the polymerized reinforced gel is exposed to subcritical drying. In this instance the gel is cooled below the freezing point of the second solvent and subjected to a freeze drying or lyophilization process to produce the aerogel. For example, if the second solvent is water, then the polymerized gel is cooled to below 0° C. After cooling, the polymerized gel is subjected to a vacuum for a period of time wherein the second solvent is allowed to sublime.

In still another embodiment after solvent exchange, the polymerized reinforced gel is exposed to subcritical drying with optional heating after the majority of the second solvent has been removed through sublimation. In this instance the partially dried gel material is heated to a temperature near or above the boiling point of the second solvent for a period of time. The period of time can range from a few hours to several days, although a typical period of time is approximately 4 hours. During the sublimation process, a portion of the second solvent present in the polymerized gel has been removed, leaving the mesoporous and microporous gel. After the sublimation process is complete, or nearly complete, the aerogel has been formed.

In yet another embodiment after solvent exchange, the polymerized reinforced gel can be dried under ambient conditions, for example by removing the solvent under a stream of air or anhydrous gas.

D. Articles of Manufacture

In some aspects, an article of manufacture is presented including the reinforced aerogel described above. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration applications, oil-based filtration applications, and solvent-based filtration applications.

1. Fluid Filtration Applications

In some embodiments, the reinforced aerogel described above can be used in fluid filtration systems and apparatus. In such applications, the support film is permeable to the fluid being filtered. A feed fluid can be contacted with the reinforced aerogel such that all or, substantially all, of the impurities and/or desired substances are removed from the feed fluid to produce a filtrate essentially devoid of the impurities and/or desired substances. The filtrate, impurities, and/or desired substances can be collected, stored, transported, recycled, or further processed. The highly branched polyimide aerogel can be further processed to release the impurities and/or desired substances from the aerogel.

The reinforced aerogel described herein can be used in or with filtration apparatuses known in the art. Non-limiting examples of filtration apparatuses and applications include gas filters such as, but not limited to, building air filters, automotive cabin air filters, combustion engine air filters, aircraft air filters, satellite air filters, face mask filters, diesel particulate filters, in-line gas filters, cylinder gas filters, soot filters, pressure swing absorption apparatus, etc. Additional non-limiting examples of filtration apparatuses and applications include solvent filtration systems, column filtration, chromatography filtration, vacuum flask filtration, microfiltration, ultrafiltration, reverse osmosis filtration, nanofiltration, centrifugal filtration, gravity filtration, cross flow filtration, dialysis, hemofiltration, hydraulic oil filtration, automotive oil filtration, etc. Further, non-limiting examples of the purpose of filtration includes sterilization, separation, purification, isolation, etc.

A fluid for filtration ("feed") and a filtrate can be any fluid. The fluid can be a liquid, gas, supercritical fluid, or mixture thereof. In some instances, the fluid can be aqueous, organic, non-organic, biological in origin, or a mixture thereof. In some instances, the fluid can contain solids and/or other fluids. As non-limiting examples, the fluid can be or can be partially water, blood, an oil, a solvent, air, or mixtures thereof. Water can include water, any form of steam and supercritical water.

In some instances, the fluid can contain impurities. Non-limiting examples of impurities include solids, liquids, gases, supercritical fluids, objects, compounds, and/or chemicals, etc. What is defined as an impurity may be different for the same feed fluid depending on the filtrate desired. In some embodiments, one or more aerogels can be used to remove impurities. Non-limiting examples of impurities in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, defoamants, chelating agents, microorganisms, particulate matter, etc. Non-limiting examples of impurities in blood can include red blood cells, white blood cells, antibodies, microorganisms, water, urea, potassium, phosphorus, gases, particulate matter, etc. Non-limiting examples of impurities in oil can include water, particulate matter, heavy and/or light weight hydrocarbons, metals, sulfur, defoamants, etc. Non-limiting examples of impurities in solvents can include water, particulate matter, metals, gases, etc. Non-limiting impurities in air can include water, particulate matter, microorganisms, liquids, carbon monoxide, sulfur dioxide, etc.

In some instances, the feed fluid can contain desired substances. Desired substances can be, but are not limited to, solids, liquids, gases, supercritical fluids, objects, compounds, and/or chemicals, etc. In some embodiments, one or more aerogels can be used to concentrate or capture a desired substance, or remove a fluid from a desired substance. Non-limiting examples of desired substances in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, chelating agents, defoamants, etc. Non-limiting examples of desired substances in blood can include red blood cells, white blood cells, antibodies, lipids, proteins, etc. Non-limiting examples of desired substances in oil can include hydrocarbons of a range of molecular weights, gases, metals, etc. Non-limiting examples of desired substances in solvents can include particulate matter, fluids, gases, proteins, lipids, etc. Non-limiting examples of desired substances in air can include water, fluids, gases, particulate matter, etc.

Figure 6:
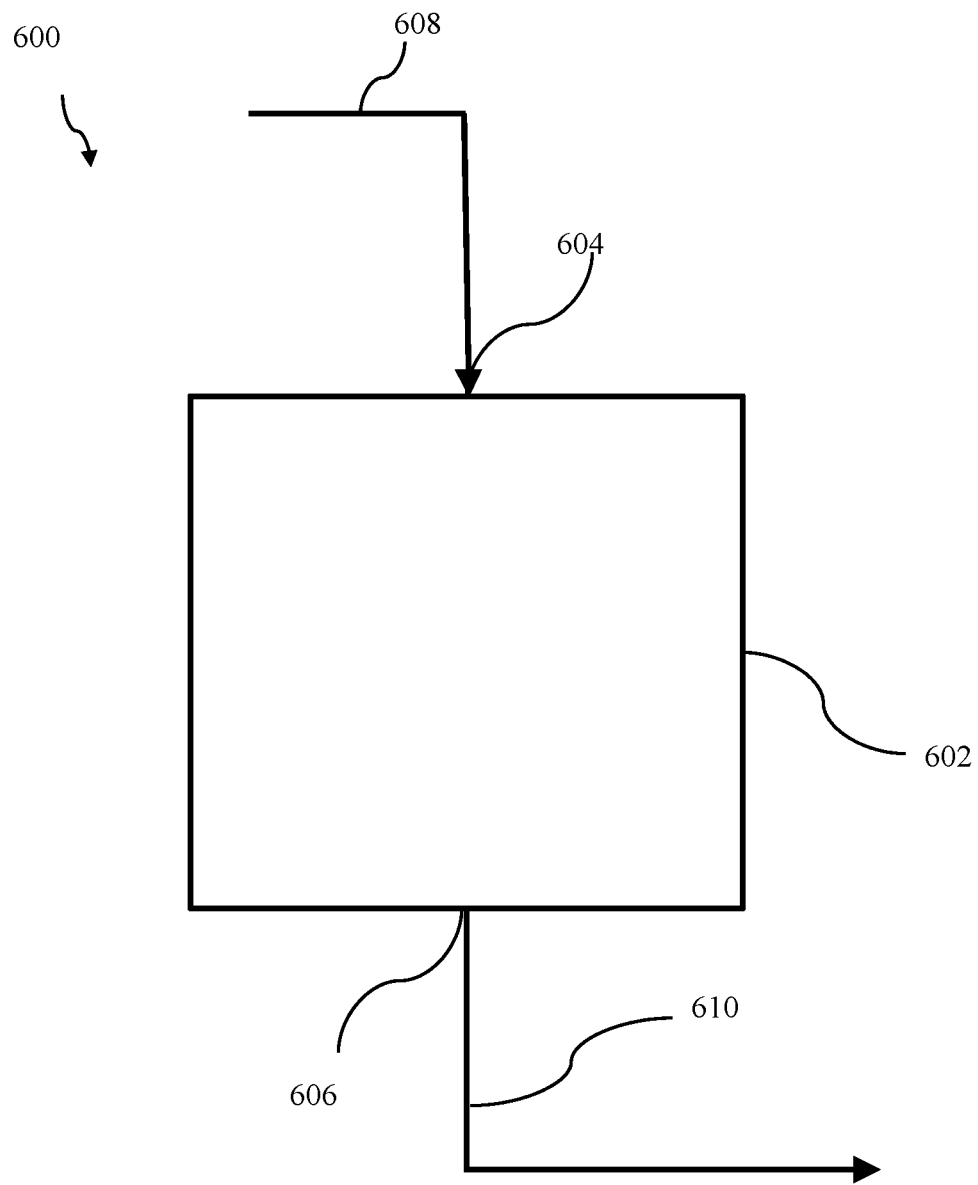
FIG. 6 is a schematic of system of an embodiment for filtering a fluid using a branched polyimide aerogel, the system having a separation zone, an inlet, and an outlet.
Figure 7:
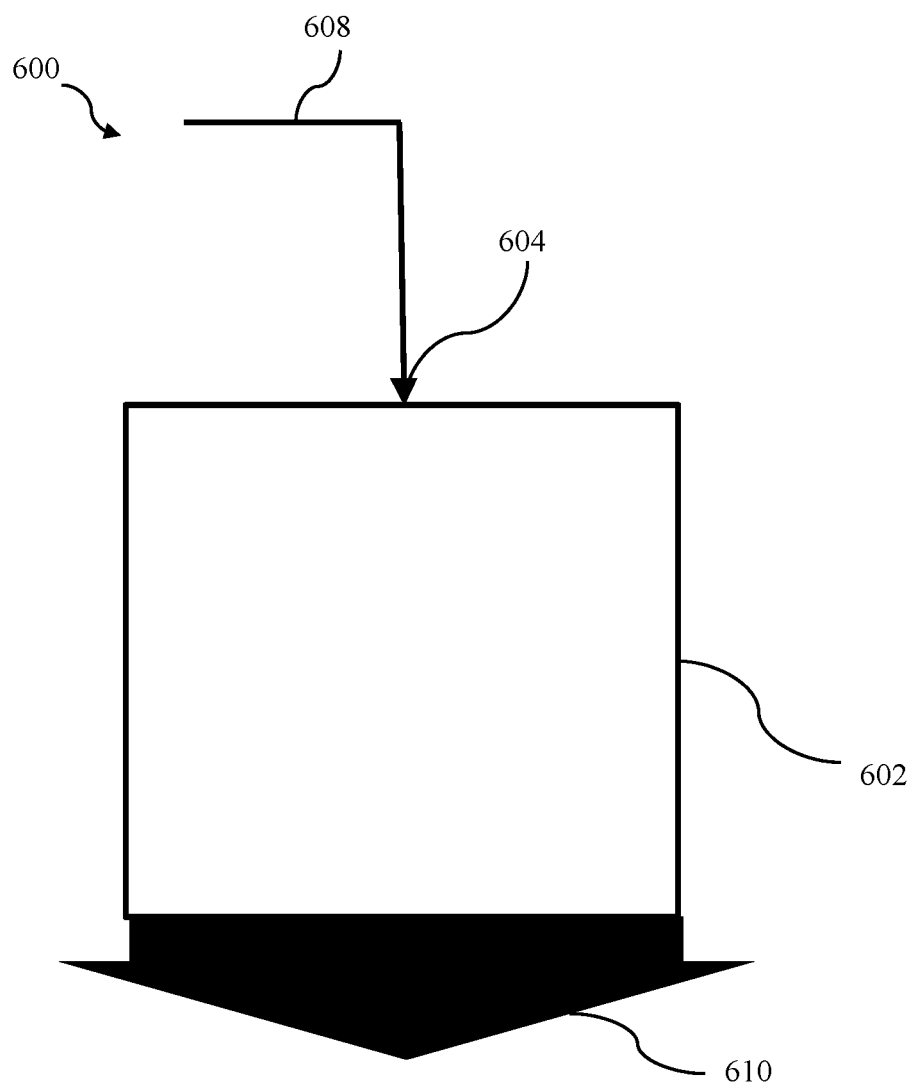
FIG. 7 is a schematic of system of an embodiment for filtering a fluid using a branched polyimide aerogel, the system having a separation zone and an inlet.
Figure 8:
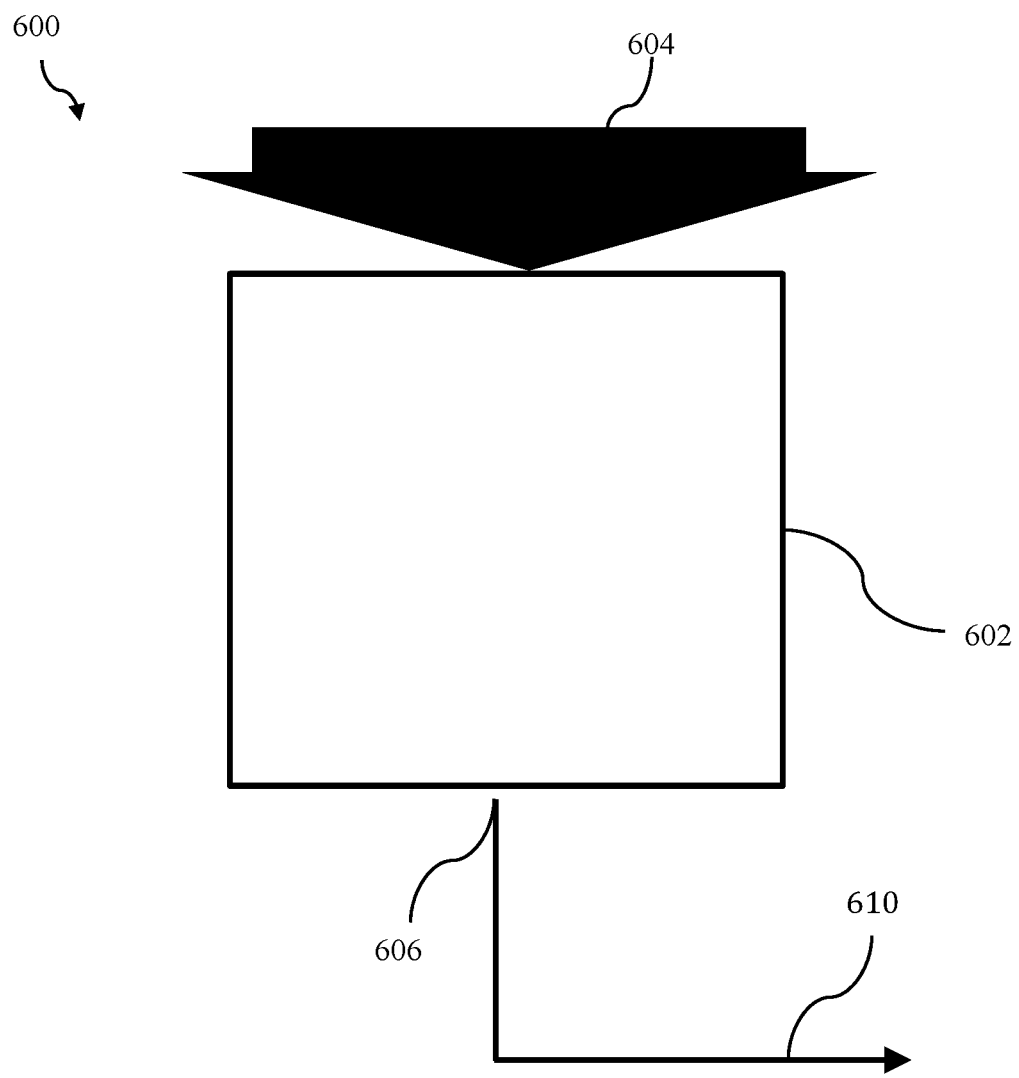
FIG. 8 is a schematic of system of an embodiment for filtering a fluid using a branched polyimide aerogel, the system having a separation zone and an outlet.

FIGS. 6 through 8 are non-limiting schematics of a system 600 used to carry out a filtration of a fluid using an aerogel. System 600 can include a separation zone 602. The materials, size, and shape of the separation zone 602 can be determined using standard engineering practice to achieve the desired flow rates and contact time. The separation zone 602 is capable of holding or may be made of one or more aerogels and includes a feed fluid inlet 604 (inlet) and/or a filtrate outlet 606 (outlet). In some instances, the separation zone is made entirely of one or more branched polyimide aerogels or one or more branched polyimide aerogels in or around a supporting structure. The feed fluid 608 can be introduced to the separation zone 602 through the inlet 104 (See, FIGS. 6 and 7) or through direct contact with the separation zone 602 (FIG. 8). In some embodiments, the feed fluid 608 can be received under greater or reduced pressure than ambient pressure. Introduction of the feed fluid 608 into separation zone 602 can be at a rate sufficient to allow optimum contact of the feed fluid with the one or more aerogels. Contact of the feed fluid 608 with the aerogel can allow the feed fluid to be filtered by the aerogel, which results in the filtrate 610. The filtrate 610 can have less impurity and/or desired substance when compared with the feed fluid 608. In certain aspects, the filtrate 610 can be essentially free of the impurity and/or the desired substance. The filtrate 610 can exit the separation zone 602 via the outlet 606 (See, FIGS. 6 and 8) or through directly exiting the separation zone 602 (See, FIG. 7). In some instances, the filtrate can be recycled back to a separation zone, collected, stored in a storage unit, etc. In some instances, one or more aerogels can be removed and/or replaced from the separation zone. In some instances, the filtrate 610 can be collected and/or removed from the separation zone 602 without the filtrate 610 flowing through an outlet 606. In some instances, the impurities and/or desired substance can be removed from the separation zone 602. As one non-limiting example, the impurities and/or desired substances can be removed from the separation zone by flowing a fluid through the separation zone in the reverse direction from the flow of the feed fluid through the separation zone.

The filtration conditions in the separation zone 602 can be varied to achieve a desired result (e.g., removal of substantially all of the impurities and/or desired substance from the feed fluid). The filtration conditions include temperature, pressure, fluid feed flow, filtrate flow, or any combination thereof. Filtration conditions are controlled, in some instances, to produce streams with specific properties. The separation zone 602 can also include valves, thermocouples, controllers (automated or manual controllers), computers or any other equipment deemed necessary to control or operate the separation zone. The flow of the feed fluid 604 can be adjusted and controlled to maintain optimum contact of the feed fluid with the one or more aerogel. In some embodiments, computer simulations can be used to determine flow rates for separation zones of various dimensions and various aerogels.

The compatibility of an aerogel with a fluid and/or filtration application can be determined by methods known in the art. Some properties of an aerogel that may be determined to assess the compatibility of the aerogel may include, but is not limited to: the temperature and/or pressures that the aerogel melts, dissolves, oxidizes, reacts, degrades, or breaks; the solubility of the aerogel in the material that will contact the aerogel; the flow rate of the fluid through the aerogel; the retention rate of the impurity and/or desired product form the feed fluid; etc.

2. Radiofrequency (RF) Applications

Due to their low density, mechanical robustness, light weight, and low dielectric properties, the branched polyimide aerogels can be used in radiofrequency (RF) applications. The use of branched polyimide aerogels in RF applications enables the design of thinner substrates, lighter weight substrates and smaller substrates. Non-limiting examples of radiofrequency applications include a substrate for a RF antenna, a sunshield for a RF antenna, a radome, or the like. Antennas can include flexible and/or rigid antennas, broadband planar circuited antennas (e.g. a patch antennas, an e-shaped wideband patch antenna, an elliptically polarized circular patch antenna, a monopole antenna, a planar antenna with circular slots, a bow-tie antenna, an inverted-F antenna and the like). In the antenna design, the circuitry can be attached to a substrate that includes the branched polyimide aerogel and/or a mixture of the branched polyimide aerogel and other components such as other polymeric materials including adhesives or polymer films, organic and inorganic fibers (e.g. polyester, polyamide, polyimide, carbon, glass fibers), other organic and inorganic materials including silica aerogels, polymer powder, glass reinforcement, etc. The use of branched polyimide aerogels in antennas enables the design substrates with higher throughput. In addition, the branched polyimide aerogels have coefficient of linear thermal expansion (CTE) similar to aluminum and copper (e.g., CTE of 23/K and 17 ppm/K), and is tunable through choice of monomer to match CTE of other desirable materials. In some embodiments, the aerogel can be used in sunshields and/or sunscreens used to protect RF antennas from thermal cycles due to their temperature insensitivity and RF transparency. In certain embodiments, the aerogel can be used as a material in a radome application. A radome is a structural, weatherproof enclosure that protects a microwave (e.g., radar) antenna. Branched polyimide aerogels can minimize signal loss due to their low dielectric constant and also provide structural integrity due to their stiffness.

The invention claimed is:

1. A composite comprising:
   a non-fibrous organic polymer aerogel layer having a first surface and an opposing second surface; and
   a fibrous support layer having a first surface and an opposing second surface,
   wherein an interface is formed between a portion of the first surface of the aerogel layer and a portion of the second surface of the support layer such that the aerogel and support layers are attached to one another, and
   wherein a majority of the volume of the aerogel layer does not include the support layer.

2. The composite of claim 1, specifically excluding any adhesives or binders wherein the fibrous support film or layer is integrated with the aerogel layer such that the support film or layer adheres to the aerogel layer without the use of an adhesive or binder.

3. The composite of claim 1, wherein the aerogel layer is a polyimide aerogel.

4. The composite of claim 1, wherein the aerogel layer is at most 15 mils thick.

5. The composite of claim 1, wherein the aerogel layer is between 1.5 to 15 mils thick.

6. The composite of claim 1, wherein the fibers in the fibrous support layer have an average filament cross sectional area of 7 to 800 $\mu m^2$.

7. The composite of claim 1, wherein the fibrous support layer is 1 mil or less in thickness.

8. The composite of claim 1, wherein the fibrous support layer is between 0.25 and 1 mil thick.

9. The composite of claim 1, wherein the fibrous support layer is a paper support.

10. The composite of claim 1, wherein the fibrous support layer further comprises unidirectional fibers.

11. The composite of claim 1, wherein the fibers in the fibrous support layer are omnidirectional fibers.

12. The composite of claim 1, wherein the fibers in the fibrous support layer have an aspect ratio of less than 60.

13. The composite of claim 1, wherein the fibers in the fibrous support layer have an aspect ratio of greater than 60.

14. The composite of claim 1, wherein the fibrous support layer comprises microfibers.

15. The composite of claim 1, wherein the fibrous support layer comprises natural, synthetic, semi-synthetic fibers, or combinations thereof.

16. The composite of claim 1, wherein the fibrous support layer comprises vegetable, wood, animal, mineral, biological fibers, or combinations thereof.

17. The composite of claim 1, wherein the fibrous support layer comprises rayon, bamboo, diacetate, triacetate fibers, or combinations thereof.

18. The composite of claim 1, wherein fibrous support layer comprises metal, carbon, carbide, glass, mineral fibers, or combinations thereof.

19. The composite of claim 1, wherein the fibrous support layer comprises thermoplastic fibers, thermoset polymer fibers, or combinations thereof.

20. The composite of claim 19, wherein the thermoplastic fiber is a fiber of polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof.

21. The composite of claim 19, wherein the thermoset fiber is a fiber of polyaramid, polyimide, polybenzoxazole, polyurethane, or blends thereof.

22. The composite of claim 1, wherein the fibrous support layer comprises vinylon, polyolefin, polyethylene or polyester fibers.

23. The composite of claim 1, having a flex fatigue of at least 100,000 cycles to failure.

24. The composite of claim 1, having a tensile strength of at least 15 MPa.

25. The composite of claim 1, wherein the composite is 1.5 to 15 mils thick.

26. The composite of claim 1, consisting of the non-fibrous aerogel layer and the fibrous support layer.

27. The composite of claim 1, wherein the entire interface is positioned within the volume of the non-fibrous aerogel layer.

28. The composite of claim 1, wherein the entire volume of the fibrous support layer is positioned in the volume of the non-fibrous aerogel layer.

29. The composite of claim 1, wherein a portion of the volume of the fibrous support layer is positioned within the volume of the non-fibrous aerogel layer and a second portion of the fibrous support layer is positioned outside the volume of the non-fibrous aerogel layer.

30. The composite of claim 1, wherein the composite is rolled-up such that the composite is in the form of a roll.

* * * * *

UNITED STATES PATENT AND TRADEMARK OFFICE
CERTIFICATE OF CORRECTION

PATENT NO. : 10,500,557 B2
APPLICATION NO. : 15/967926
DATED : December 10, 2019
INVENTOR(S) : Alan Sakaguchi et al.

Page 1 of 1

It is certified that error appears in the above-identified patent and that said Letters Patent is hereby corrected as shown below:

In the Claims

In Claim 2, on Column 17 at Line 58, remove "film or".

In Claim 2, on Column 17 at Line 60, remove "film or".

In Claim 18, on Column 18 at Line 30, insert --the-- between "wherein" and "fibrous".

Signed and Sealed this
Seventh Day of July, 2020

Andrei Iancu
*Director of the United States Patent and Trademark Office*